United States Patent
Katsumoto et al.

[11] Patent Number: 6,114,063
[45] Date of Patent: *Sep. 5, 2000

[54] ALKALINE STORAGE BATTERY AND METHOD FOR TREATING SURFACE OF POSITIVE ELECTRODE ACTIVE MATERIAL THEREOF

[75] Inventors: Masumi Katsumoto, Kamakura; Norikatsu Akutsu, Hiratsuka; Takeshi Yao, Fujisawa; Yasuharu Yamamura, Kanazawa, all of Japan

[73] Assignee: Matsushita Electric Industrial Co., Ltd., Osaka, Japan

[ * ] Notice: This patent is subject to a terminal disclaimer.

[21] Appl. No.: 09/034,910

[22] Filed: Mar. 4, 1998

[30] Foreign Application Priority Data

Mar. 21, 1997 [JP] Japan ................................... 9-067669
Jun. 19, 1997 [JP] Japan ................................... 9-162246
Sep. 10, 1997 [JP] Japan ................................... 9-245042
Dec. 3, 1997 [JP] Japan ................................... 9-332606

[51] Int. Cl.[7] ............................................. H01M 4/52
[52] U.S. Cl. ........................................ 429/223; 423/594
[58] Field of Search ........................... 429/223; 423/594; 252/521.2; 205/60

[56] References Cited

U.S. PATENT DOCUMENTS 5,629,111  5/1997  Yamawaki et al. .
5,672,447  9/1997  Yamawaki et al. .
5,702,762  12/1997  Baba et al. .
5,804,334  8/1998  Yamamura et al. ................ 429/223 X

FOREIGN PATENT DOCUMENTS

62-237667  10/1987  Japan .
9-259878  10/1997  Japan .
9-259887  10/1997  Japan .

*Primary Examiner*—Maria Nuzzolillo
*Assistant Examiner*—Susy Tsang
*Attorney, Agent, or Firm*—Stevens, Davis, Miller & Mosher, L.L.P.

[57] ABSTRACT

An alkaline storage battery comprises a positive electrode prepared by filling a nickel hydroxide in a porous plaque as an active material, a negative electrode, a separator and an alkaline electrolyte, the positive electrode containing the nickel hydroxide as a main component and a complex oxide of lithium and cobalt as a conductive agent. The lithium-cobalt complex oxide as a conductive agent is preferably represented by the formula $Li_xCoO_2$ (x is 0.2–0.9).

28 Claims, 8 Drawing Sheets

FIG.10

ALKALINE STORAGE BATTERY AND METHOD FOR TREATING SURFACE OF POSITIVE ELECTRODE ACTIVE MATERIAL THEREOF

BACKGROUND OF THE INVENTION

1. Field of the Invention

The present invention relates to an alkaline storage battery using a nickel electrode and provides an alkaline storage battery having a long life which is improved in charging receptivity after having been left to stand and thus being deeply discharged, thereby to heighten capacity recovery after charging and which can give a utilization ratio of positive electrode active material nearly the same as initial utilization ratio at the subsequent discharging.

2. Description of the Related Art

Non-sintered Ni electrodes used in alkaline storage batteries represented by nickel-hydrogen storage batteries and nickel-cadmium storage batteries have advantages of higher filling density of active material and simpler production process as compared with conventional sintered Ni electrodes, and are widely used at present.

Representative non-sintered Ni electrodes comprise a plaque of foamed or fibrous nonwoven fabric having a porosity of 90% or more, in which active material powders mainly composed of nickel hydroxide are filled. However, in the case of such non-sintered Ni electrodes, when only spherical nickel hydroxide powders having good filling properties are filled in spaces of plaque, no sufficient utilization ratio of active materials can be obtained since electrical conductivity of the plaque per se and electrodes is low. Therefore, it is necessary to heighten conductivity of the active materials to improve utilization ratio of active materials, and JP-A-62-237667 proposes to add cobalt compounds such as cobalt hydroxide powders and cobalt oxide powders as conductive agents to active materials.

When alkaline storage batteries are fabricated using these nickel electrodes comprising a plaque filled with a nickel hydroxide and a conductive agent such as cobalt hydroxide or cobalt oxide in the spaces thereof, the cobalt compound dissolves in an alkaline electrolyte as cobaltic acid ion, which uniformly disperses as cobalt hydroxide on the surface of nickel hydroxide. Thereafter, this cobalt hydroxide is oxidized to cobalt oxyhydroxide of high conductivity at the time of initial charging of batteries to form an electrically conductive network which connects between the active materials and between the active material and the porous plaque, and heightens the conductivity therebetween to improve utilization ratio of the active materials.

In recent electronic portable apparatuses, with increase of chances to use batteries as electric source, for example, in notebook-type personal computers, they are often left to stand for a long time in the state of the battery being connected to the circuit due to the inadvertent failure to shut off the power. If the apparatuses are left to stand for a long time in such state, the battery is discharged until the voltage reaches less than service voltage range (higher than 0.8 V), and after the capacity of the battery is lost, the battery is still in the state of being left to stand for a long time under discharging, namely, so-called deeply discharged state.

Since in the battery in deeply discharged state, potential of the positive electrode is lower than the reduction potential of cobalt oxyhydroxide (about 0 V for Hg/HgO electrode potential), there occurs a phenomenon that cobalt oxyhydroxide which forms the conductive network is reduced and dissolves out. Therefore, in the battery which is once in deeply discharged state, the conductive network formed between active materials and between the active material and the porous plaque is partially broken, and, hence, charging receptivity lowers and when the battery is again charged and discharged thereafter, utilization ratio of active material equal to initial one cannot be obtained.

SUMMARY OF THE INVENTION

The present invention solves the above problems in conventional techniques, and a main object of the present invention is to provide an alkaline storage battery having a prolonged service life which is improved in charging receptivity after left to stand with being deeply discharged by improving a nickel electrode, thereby to enhance capacity recovery after charging and which can give a utilization ratio of positive electrode active material nearly the same as initial utilization ratio at the subsequent discharging.

For attaining the above object, the alkaline storage battery of the present invention comprises a positive electrode prepared by filling a nickel hydroxide in a porous plaque as an active material, a negative electrode, a separator and an alkaline electrolyte, said positive electrode containing the nickel hydroxide as a main component and a complex oxide of lithium and cobalt (hereinafter referred to as "lithium-cobalt complex oxide") as a conductive agent.

The lithium-cobalt complex oxide is preferably a compound represented by the formula $Li_xCoO_2$ (x is 0.2–0.9).

The lithium-cobalt complex oxide can be contained in the positive electrode in the forms of, for example, (i) a mixture of nickel hydroxide powders with the lithium-cobalt complex oxide powders; (ii) nickel hydroxide powders coated with the lithium-cobalt complex oxide; and (iii) a mixture of, nickel hydroxide powders coated with the lithium-cobalt complex oxide with the lithium-cobalt complex oxide powders.

The lithium-cobalt complex oxide powders may contain one or both of sodium and potassium in order to improve the conductivity in an amount of 2–30 preferably 10–20 atomic % based on the amount of cobalt. The amount of lithium is 10–90 preferably 30–60 atomic % based on the amount of cobalt.

DESCRIPTION OF THE PREFERRED EMBODIMENT

The first preferred embodiment of the present invention is an alkaline storage battery which comprises a positive electrode prepared by filling a nickel hydroxide in a porous plaque as an active material, a negative electrode, a separator and an alkaline electrolyte, wherein said positive electrode contains a mixture of nickel hydroxide powders as a main component and lithium-cobalt complex oxide powders represented by the formula $Li_xCoO_2$ (x is 0.2–0.9) as a conductive agent. This battery is high in initial utilization ratio of active material of the positive electrode, and even if the battery is in deeply discharged state, when subsequently recovering charging is performed and when the battery is again discharged, excellent utilization ratio of active material substantially the same as the initial utilization ratio can be obtained.

This is because the lithium-cobalt complex oxide represented by the formula $Li_xCoO_2$ (x is 0.2–0.9) is high in conductivity and, hence, conductivity of the whole positive electrode can be improved and the utilization ratio of the positive electrode active material can be maintained at high level. Furthermore, since the complex oxide is stable against oxidation and reduction, even when the positive electrode potential lowers to about –0.9 V (for Hg/HgO electrode potential) which is a potential corresponding to that of the negative electrode, decomposition and reduction hardly take place and thus a high conductivity can be maintained. The lithium-cobalt complex oxide powders represented by the formula $Li_xCoO_2$ (x is 0.2–0.9) are preferred because when x is 0.2–0.9, crystal structure of the lithium-cobalt complex oxide is stable and the complex oxide is superior in conductivity.

Moreover, when the lithium-cobalt complex oxide powders have an average particle size of 1 μm or less and are mixed in an amount of 5–15 parts by weight for 100 parts by weight of nickel hydroxide powders, the complex oxide powders dangle round the nickel hydroxide powders and a sufficient conductive network can be formed to improve the conductivity between the active materials, and a high utilization ratio of the active materials can be obtained. Further, lithium-cobalt complex oxide powders may contain one or both of sodium and potassium in an amount of 2–30, preferably 10–20 atomic % based on the amount of cobalt, and the amount of lithium is 10–90, preferably 30–60 atomic % based on the amount of cobalt. When one or both of sodium and potassium are added, the amount of the lithium-cobalt complex oxide powders added to 100 parts by weight of nickel hydroxide powders is preferably 3–15 parts by weight.

The second preferred embodiment of the present invention is an alkaline storage battery which comprises a positive electrode prepared by filling a nickel hydroxide in a porous plaque as an active material, a negative electrode, a separator and an alkaline electrolyte, wherein the active material filled in the plaque of the positive electrode comprises a mixture of nickel hydroxide powders with nickel hydroxide powders at least a part of the surface of which is coated with a lithium-cobalt complex oxide represented by the formula $Li_xCoO_2$ (x is 0.2–0.9).

By coating the surface of the nickel hydroxide powders with the lithium-cobalt complex oxide having a high conductivity, it becomes possible to effectively form a network of high conductivity between active materials to heighten utilization ratio of active material and thus to provide a positive electrode of high capacity. Furthermore, since the lithium-cobalt complex oxide is superior in stability in a reducing atmosphere, even in deeply discharged state, the nickel positive electrode does not decrease in charging receptivity and a high utilization ratio of active material which is similar to the initial utilization ratio by the subsequent charging. The amount of the lithium-cobalt complex oxide powders for 100 parts by weight of nickel hydroxide powders is preferably 5–10 parts by weight. Further, lithium-cobalt complex oxide powders may contain one or both of sodium and potassium in an amount of 2–30, preferably 10–20 atomic % based on the amount of cobalt, and the amount of lithium is 10–90, preferably 30–60 atomic % based on the amount of cobalt. When one or both of sodium and potassium are added, the amount of the lithium-cobalt complex oxide powders for 100 parts by weight of nickel hydroxide powders is preferably 2–10 parts by weight. In the above cases, when the whole surface of the nickel hydroxide powders is covered with lithium-cobalt complex oxide, the amount of the lithium-cobalt complex oxide powders can be reduced.

The third preferred embodiment of the present invention is an alkaline storage battery which comprises a positive electrode prepared by filling a nickel hydroxide in a porous plaque as an active material, a negative electrode, a separator and an alkaline electrolyte, wherein the active material filled in the plaque of the positive electrode comprises a mixture of nickel hydroxide powders with nickel hydroxide powders at least a part of the surface of which is coated with a lithium-cobalt complex oxide represented by the formula $Li_xCoO_2$ (x is 0.2–0.9). The amount of the lithium-cobalt complex oxide powders for 100 parts by weight of nickel hydroxide powders is preferably 2–6 parts by weight. Further, lithium-cobalt complex oxide powders may contain one or both of sodium and potassium in an amount of 2–30, preferably 10–20 atomic % based on the amount of cobalt, and the amount of lithium is 10–90, preferably 30–60 atomic % based on the amount of cobalt. When one or both of sodium and potassium are added, the amount of the lithium-cobalt complex oxide powders for 100 parts by weight of nickel hydroxide powders is preferably 1–6 parts by weight. In the above cases, when the whole surface of the nickel hydroxide powders is covered with lithium-cobalt complex oxide, the amount of the lithium-cobalt complex oxide powders can be reduced.

The fourth preferred embodiment of the present invention is to provide an alkaline storage battery which comprises a positive electrode prepared by filling a nickel hydroxide in a porous plaque as an active material, a negative electrode, a separator and an alkaline electrolyte, wherein the positive electrode comprises a mixture of nickel hydroxide powders at least a part of the surface of which is coated with a lithium-cobalt complex oxide represented by the formula $Li_xCoO_2$ (x is 0.2–0.9) as a main component with lithium-cobalt complex oxide powders represented by the formula $Li_xCoO_2$ (x is 0.2–0.9).

Coating the surface of the nickel hydroxide powders with the lithium-cobalt complex oxide as a conductive agent results in increase in adhesion therebetween, and a conductive network can be efficiently formed. However, in order to completely coat the surface of the nickel hydroxide powders with the conductive agent, setting of conditions high in accuracy is required in this coating step and this requires much trouble. Thus, when at least a part of the surface of nickel hydroxide is coated with the lithium-cobalt complex oxide to secure 50–70% of the amount necessary as a conductive agent of the positive electrode and the remainder necessary amount of 30–50% is supplied by mixing as lithium-cobalt complex oxide powders, and thereby coating on the surface of nickel hydroxide powders can be performed only by setting simple conditions. As a result, necessary amount of the conductive agent of the positive electrode can be simply secured, and, besides, utilization ratio of positive electrode active material which is close to that of nickel hydroxide powders coated with the conductive agent on the whole surface can be obtained. The amount of the lithium-cobalt complex oxide powders for 100 parts by weight of nickel hydroxide powders is preferably 4–13 parts by weight. Further, lithium-cobalt complex oxide powders may contain one or both of sodium and potassium in an amount of 2–30, preferably 10–20 atomic % based on the amount of cobalt, and the amount of lithium is 10–90, preferably 30–60 atomic % based on the amount of cobalt. When one or both of sodium and potassium are added, the amount of the lithium-cobalt complex oxide powders for 100 parts by weight of nickel hydroxide powders is preferably 2–13 parts by weight. In the above cases, when the whole surface of the nickel hydroxide powders is covered with lithium-cobalt complex oxide, the amount of the lithium-cobalt complex oxide powders can be reduced.

The present invention will be explained in detail below, referring to Examples, to which the present invention will not be restricted, and changes and modifications may be made without changing the gist of the invention.

EXAMPLE 1

Lithium-cobalt complex oxide powders 1 represented by the formula $Li_xCoO_2$ (x is 0.2–0.9) used in the present invention as a conductive agent were prepared in the following manner.

Cobalt hydroxide powders 2 having an average particle size of 0.3 μm were left to stand for 48 hours in the air at 120° C. to prepare cobalt (III) oxyhydroxide powders 3.

The resulting cobalt oxyhydroxide powders 3 were mixed with a lithium hydroxide aqueous solution (50 g/l) at a weight ratio of 1:10. The mixture was stirred for about 90 hours with keeping the temperature at about 80° C., sufficiently washed with water and dried to obtain lithium-cobalt complex oxide powders 1.

Figure 1:
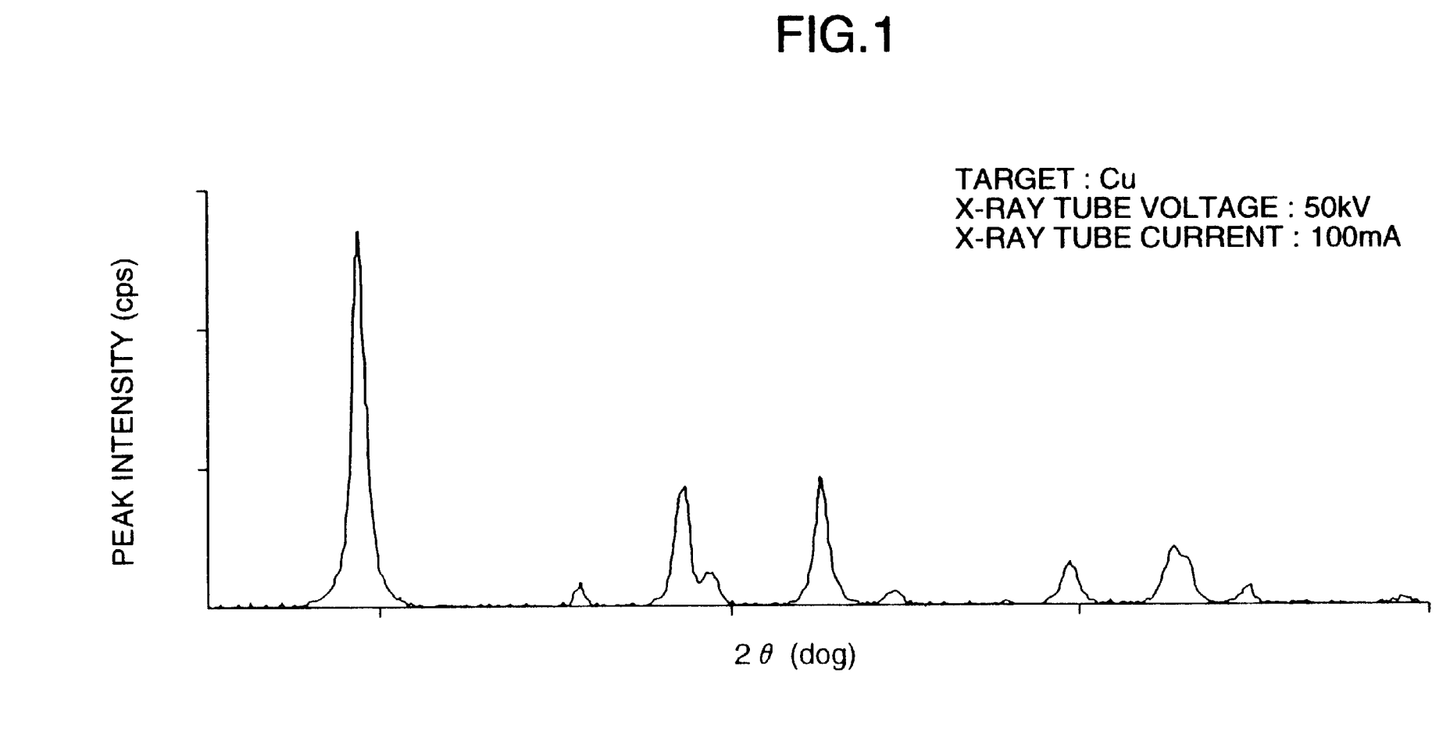
FIG. 1 shows X-ray diffraction peaks of the lithium-cobalt complex oxide powders prepared in Example 1 of the present invention.

The lithium-cobalt complex oxide powders 1 were irradiated with CuKα rays, and X-ray diffraction peaks were measured in the range of 2θ being 10–80°. The results are shown in FIG. 1. It was confirmed by JCPDS card that the peaks were attributable to $LiCoO_2$. The ratio of lithium and cobalt in the powders 1 was 0.63 in atomic ratio.

Therefore, the lithium-cobalt complex oxide powders 1 obtained were represented by the formula $Li_xCoO_2$ (wherein x is 0.63).

Ten parts by weight of the lithium-cobalt complex oxide powders 1 as a conductive agent were added to 100 parts by weight of nickel hydroxide powders 4 having an average particle size of 20 μm as an active material, and these were mixed. To the mixture was added water as a dispersion medium so that it occupied 25 parts by weight in total paste, followed by kneading to prepare a pasty active material. The pasty active material was filled in a spongy nickel porous plaque having a porosity of 95%, dried and pressed. Then, this was cut to a given size to make a positive electrode plate 5 of the present invention having a theoretical electric capacity of 1600 mAh.

Separately, a positive electrode plate of comparative example was prepared in the same manner as above, except that cobalt oxyhydroxide powders 3 were used in the same amount as a conductive agent.

A paste mainly composed of hydrogen-absorbing alloy powders having an average particle size of 20 μm was prepared and applied to a punching metal. This was cut to a given size to make a negative electrode plate 6 of 2500 mAh in electric theoretical capacity.

Figure 2:
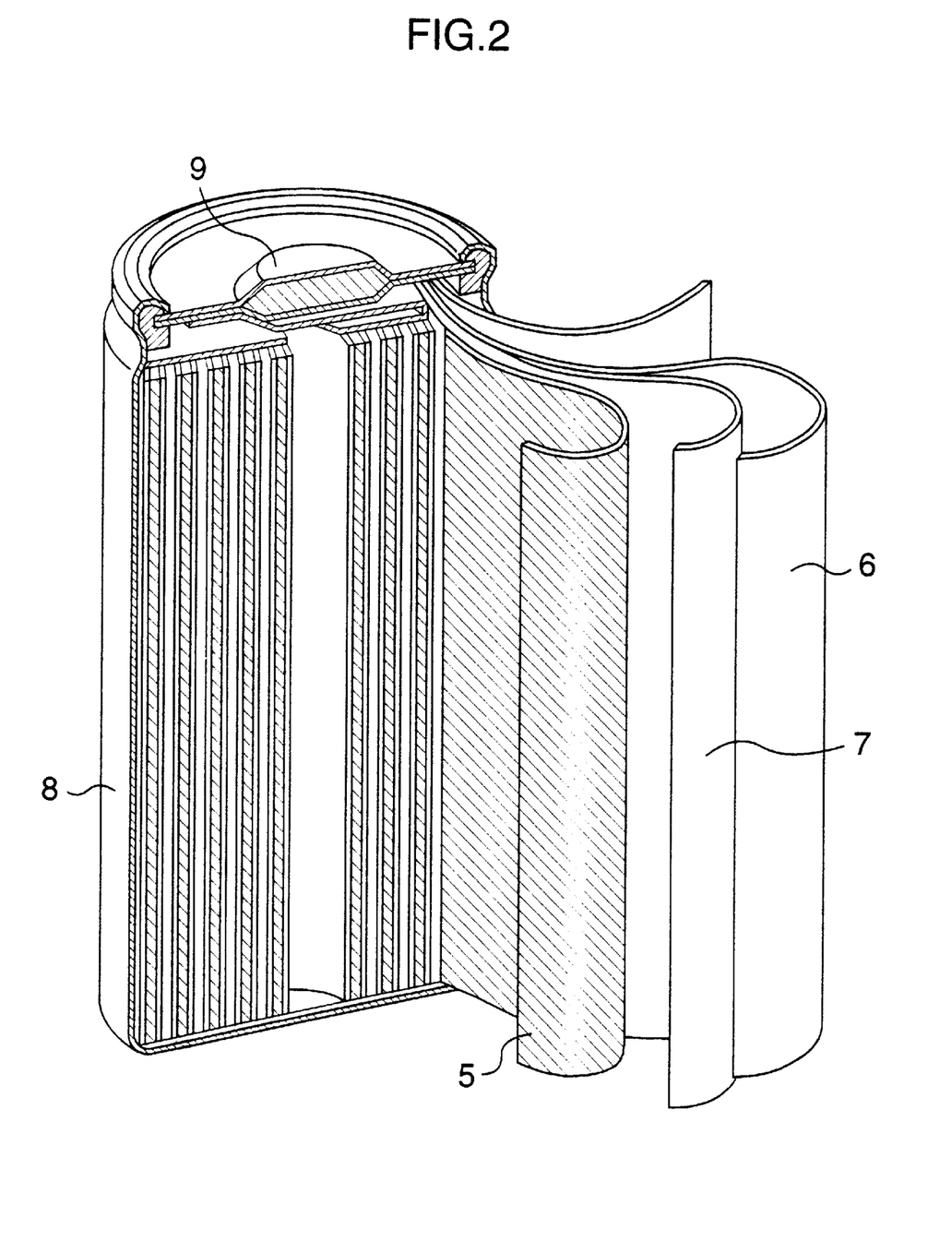
FIG. 2 is a schematic half cross-sectional view of the nickel-hydrogen storage battery in Example 2.

The above positive electrode plate 5 and negative electrode plate 6 and a separator 7 of a polypropylene nonwoven fabric interposed between the positive and negative electrode plates were rolled to form an electrode assembly, which was inserted into a metallic battery case 8 and an alkaline electrolyte was injected thereinto in a given amount. Then, the case 8 was sealed at its top portion with a sealing plate 9 which also serves as a terminal for the positive electrode, thereby to obtain a nickel-hydrogen storage battery of 4/5A size (nominal capacity: 1600 mAh). A schematic half cross-section of this battery is shown in FIG. 2.

A battery of comparative example was fabricated in the same manner as above, except that the positive electrode plate of the comparative example was used.

Using the batteries of the example of the present invention and the comparative example, the initial utilization ratio of the positive electrode active material and the utilization ratio of the positive electrode active material after subjected to deep discharging were obtained in the following manner.

First, the batteries were charged for 15 hours at 20° C. with a current of 160 mA, the charging was stopped for 1 hour, and then the batteries were discharged at 320 mA until the voltage reached 1.0 V. The initial utilization ratios of active materials for theoretical capacity of the positive electrode active materials were obtained and the results are shown in Table 1.

Then, a resistance of 1 Ω was connected to each of the batteries of the examples and the comparative example, and the batteries were left to stand with being discharged for 14 days at 65° C. In the same manner as above, utilization ratios of positive electrode active materials after subjected to deep discharging were obtained, and the results are also shown in Table 1.

TABLE 1

| Batteries | Initial utilization of positive electrode active material | Utilization ratio of positive electrode active material after deep discharging |
|---|---|---|
| Example | 98% | 97% |
| Comparative Example | 97% | 83% |

As can be seen from Table 1, the initial utilization ratio of positive electrode active material was 98% and the utilization ratio of positive electrode active material after deep discharging was 97% in the present example, which were both high, while in the comparative example, the initial utilization ratio of positive electrode active material was high, namely, 97%, but the utilization ratio of the positive electrode active material after deep discharging was 83%, which was lower 14% than the initial value.

In the comparative example, the potential of the positive electrode is lower than reduction potential of cobalt oxyhydroxide in deeply discharged state, and, hence, cobalt oxyhydroxide used as a conductive agent is reduced and dissolved out to lower in conductivity. With the lowering, the conductivity between the positive electrode active materials also lowers, and recovering state is not sufficient and the utilization ratio of the positive electrode active material after deep discharging greatly decreased.

On the other hand, in the example, since conductivity of the lithium-cobalt complex oxide per se used as a conductive agent is high, the utilization ratio of the active material is high, and, furthermore, since it is stable against oxidation and reduction, decomposition or reduction thereof hardly occurs even in discharged state and a high conductivity can be maintained. Therefore, the utilization ratio of the positive electrode active material in recovering state after deep discharging does not differ from the initial one.

EXAMPLE 2

Positive elect rode plates were prepared in the same manner as in Example 1, except that amount of the lithium-cobalt complex oxide powders 1 was 0, 2, 5, 10, or 15 parts by weight for 100 parts by weight of nickel hydroxide powders 4, and using these positive electrode plates, nickel-hydrogen storage batteries were fabricated in the same manner as in Example 1.

Figure 3:
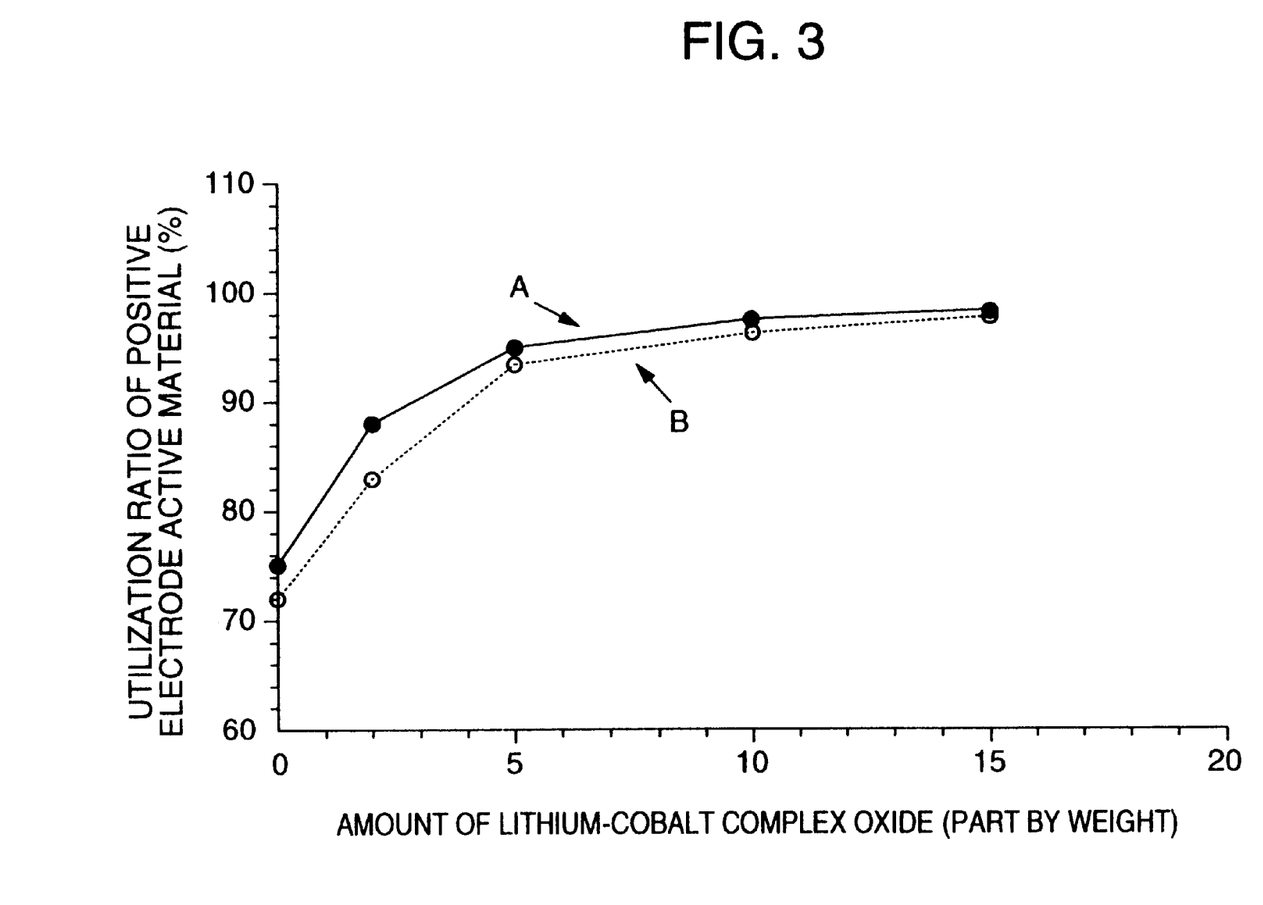
FIG. 3 is a graph which shows a relation between the amount of the lithium-cobalt complex oxide powders based on the amount of nickel hydroxide powders and utilization ratio of positive electrode active material before and after subjected to deep discharging in Example 2.

On these nickel-hydrogen storage batteries, utilization ratios of the positive electrode active materials before and after deep discharging for theoretical capacity were determined under the same conditions as in Example 1, and the results are shown in FIG. 3. In FIG. 3, ordinates show the utilization ratio of positive electrode active material and abscissas show the amount (parts by weight) of the lithium-cobalt complex oxide powders 1 based on 100 parts by weight of nickel hydroxide powders 4, and A shows the initial utilization ratio of the positive electrode active material and B shows the utilization ratio of the positive electrode active material after deep discharging.

From FIG. 3, when amount of the lithium-cobalt complex oxide powders 1 mixed with 100 parts by weight of nickel hydroxide powders 4 is 5 parts by weight or more, a stable utilization ratio of positive electrode active material can be obtained and this tendency continues even with increase of the amount of lithium-cobalt complex oxide powders 1. However, from the point of the battery capacity, when the amount of the lithium-cobalt complex oxide powders is more than 15 parts by weight, the amount of the active material per se relatively decreases and battery capacity decreases. Therefore, amount of lithium-cobalt complex oxide powders 1 mixed with 100 parts by weight of nickel hydroxide powders 4 is preferably 5–15 parts by weight.

When the battery after subjected to deep discharging was disassembled and the materials of the positive electrode were analyzed, X-ray diffraction peaks shown in FIG. 1 were detected and thus it was confirmed that the lithium-cobalt complex oxide was scattered in the battery.

EXAMPLE 3

A method for forming a coating layer of lithium-cobalt complex oxide 10 represented by the formula $Li_xCoO_2$ on the surface of nickel hydroxide powders 4 as a positive electrode active material will be shown below.

To a solution prepared by suspending nickel hydroxide powders 4 in water were added a cobalt sulfate aqueous solution of 1.30 in specific gravity and a sodium hydroxide aqueous solution (200 g/l) to maintain pH at 9–10, whereby a coating layer of cobalt hydroxide was formed on the surface of nickel hydroxide powders 4.

The nickel hydroxide powders 4 coated with cobalt hydroxide were heat-treated in the air at 120° C. for 48 hours to oxidize the cobalt hydroxide layer on the surface of nickel hydroxide powders 4 to cobalt oxyhydroxide.

The nickel hydroxide powders 4 coated with cobalt oxyhydroxide were mixed with an alkali aqueous solution containing 50 g/l of lithium hydroxide at a weight ratio of 1:5 (ordinarily 20–100 g/l of lithium hydroxide can be used). Then, the mixture was stirred for 48 hours with keeping the temperature at 80° C. (ordinarily the stirring can be carried out for 12–100 hours with keeping the temperature at 60–95° C.), whereby cobalt oxyhydroxide was reacted with lithium to form a coating layer of lithium-cobalt complex oxide 10 on the surface of nickel hydroxide powders 4.

The powders were subjected to X-ray diffraction to detect X-ray diffraction peaks attributable to $Li_xCoO_2$ in nickel hydroxide powders 4, and thus it was confirmed that a coating layer of lithium-cobalt complex oxide 10 was formed. Further, the powders 4 were observed by an electron microscope, thereby to confirm that a coating layer of lithium-cobalt complex oxide 10 was formed on at least a part of the surface of the powders.

Then, the amount of cobalt hydroxide coated on the surface of nickel hydroxide powders was changed by adjusting the amount of cobalt sulfate aqueous solution used in the above treatment, whereby amount of the lithium-cobalt complex oxide formed around nickel hydroxide powders 4 was adjusted to 2.9, 7.3, 11.8, 14.9 or 22.9 parts by weight for 100 parts by weight of the nickel hydroxide powders.

The nickel hydroxide powders coated with lithium-cobalt complex oxide which were obtained by the above treatment were mixed with nickel hydroxide powders at a weight ratio of 7:3, thereby to obtain nickel hydroxide powders where the amount of the lithium-cobalt complex oxide coated on the surface of nickel hydroxide powders was 2, 5, 8, 10 or 15 parts by weight for 100 parts by weight of the nickel hydroxide powders.

Figure 4:
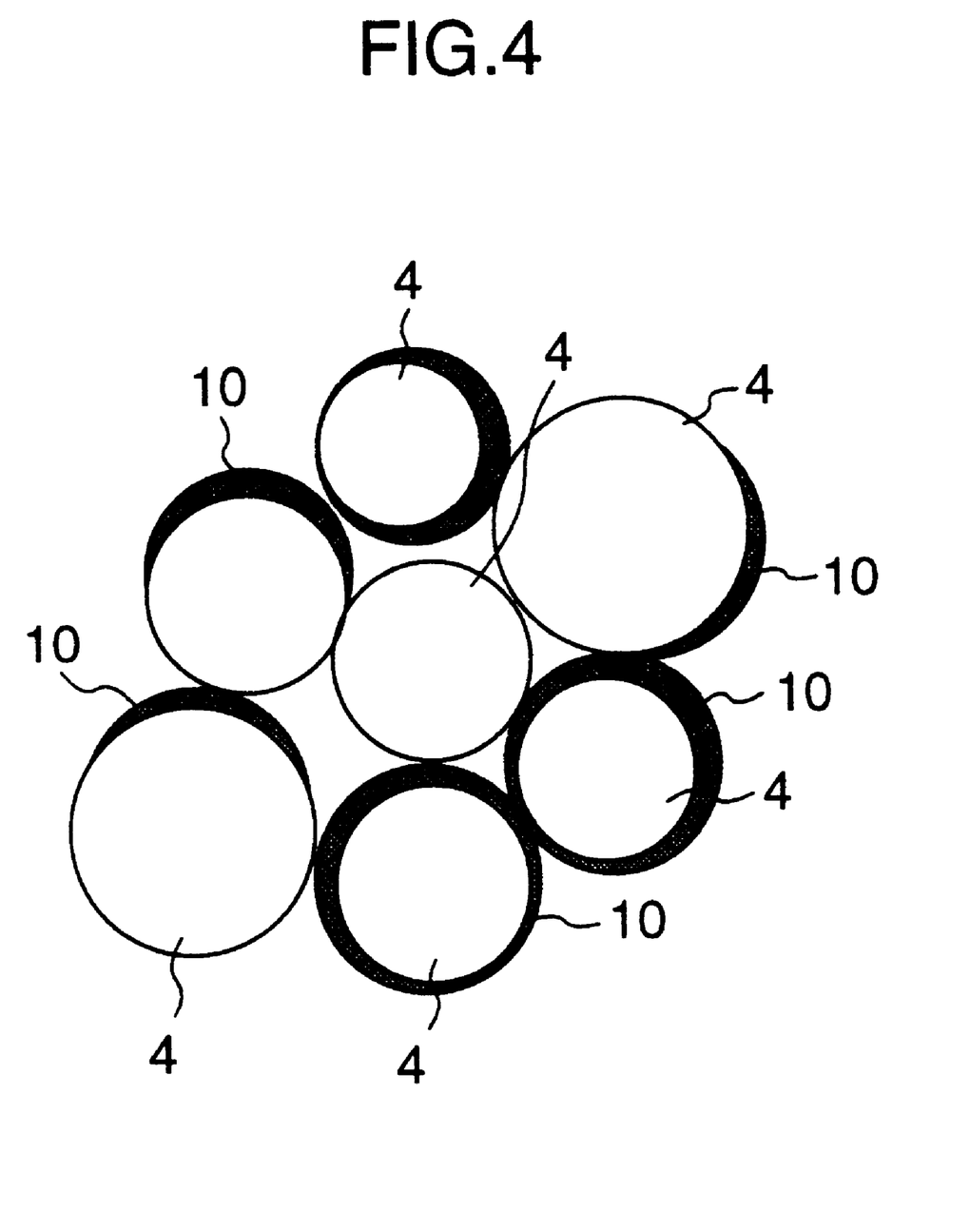
FIG. 4 schematically shows relation between powders of positive electrode active material in positive electrodes a1–a5 in Example 3.

To the nickel hydroxide powder mixture was added water as a dispersion medium so that it occupied 25 parts by weight in the total paste, followed by kneading to prepare a pasty active material. This was filled in a spongy nickel porous plaque of 95% in porosity and dried, and this porous plaque was pressed and cut to a given size to make positive electrode plates a1–a5 having a theoretical electric capacity of 1600 mAh. FIG. 4 schematically shows the state of the nickel hydroxide powders which are positive electrode active materials in the positive electrode plates a1–a5. In FIG. 4, 4 indicates nickel hydroxide powders and 10 indicates lithium-cobalt complex oxide.

A paste mainly composed of hydrogen-absorbing alloy powders of 20 μm in average particle size was prepared and this was coated on a punching metal, and cut to a given size to make a negative electrode plate having a theoretical electric capacity of 2500 mAh.

Each of the positive electrode plates a1–a5, the negative electrode plate and a separator comprising a polypropylene nonwoven fabric interposed between the positive electrode plate and the negative electrode plate were rolled to produce an electrode assembly. The electrode assembly was inserted into a metallic battery case and an alkaline electrolyte was injected in the case. The case was sealed at its top with a sealing plate which also serves as a terminal for positive electrode to make nickel-hydrogen storage batteries A1–A5 of 4/5A size and of 1600 mAh in nominal capacity.

Next, lithium-cobalt complex oxide powders as a conductive agent to be mixed with nickel hydroxide powders were prepared in the following manner.

Cobalt hydroxide powders having an average particle size of 0.3 μm were left to stand for 48 hours in the air at 120° C. to prepare cobalt (III) oxyhydroxide powders.

The cobalt oxyhydroxide powders and a lithium hydroxide aqueous solution (50 g/l) at a weight ratio of 1:10 were stirred for about 90 hours with keeping the temperature at about 80° C., sufficiently washed with water and dried to prepare lithium-cobalt complex oxide powders.

The resulting lithium-cobalt complex oxide powders were mixed with nickel hydroxide powders in an amount of 2, 5, 8, 10 or 15 parts by weight for 100 parts by weight of the nickel hydroxide powders. Using these mixtures, positive electrode plates b1–b5 were made in the same manner as in making a1–a5. Nickel-hydrogen storage batteries B1–B5 were fabricated in the same manner as in fabrication of batteries A1–A5 except for using the positive electrode plates b1–b5.

The batteries A1–A5 and B1–B5 were subjected to tests under the same conditions as explained in Example 1 to obtain initial utilization ratios of the positive electrode active materials and utilization ratios of the positive electrode active materials after deep discharging.

Figure 5:
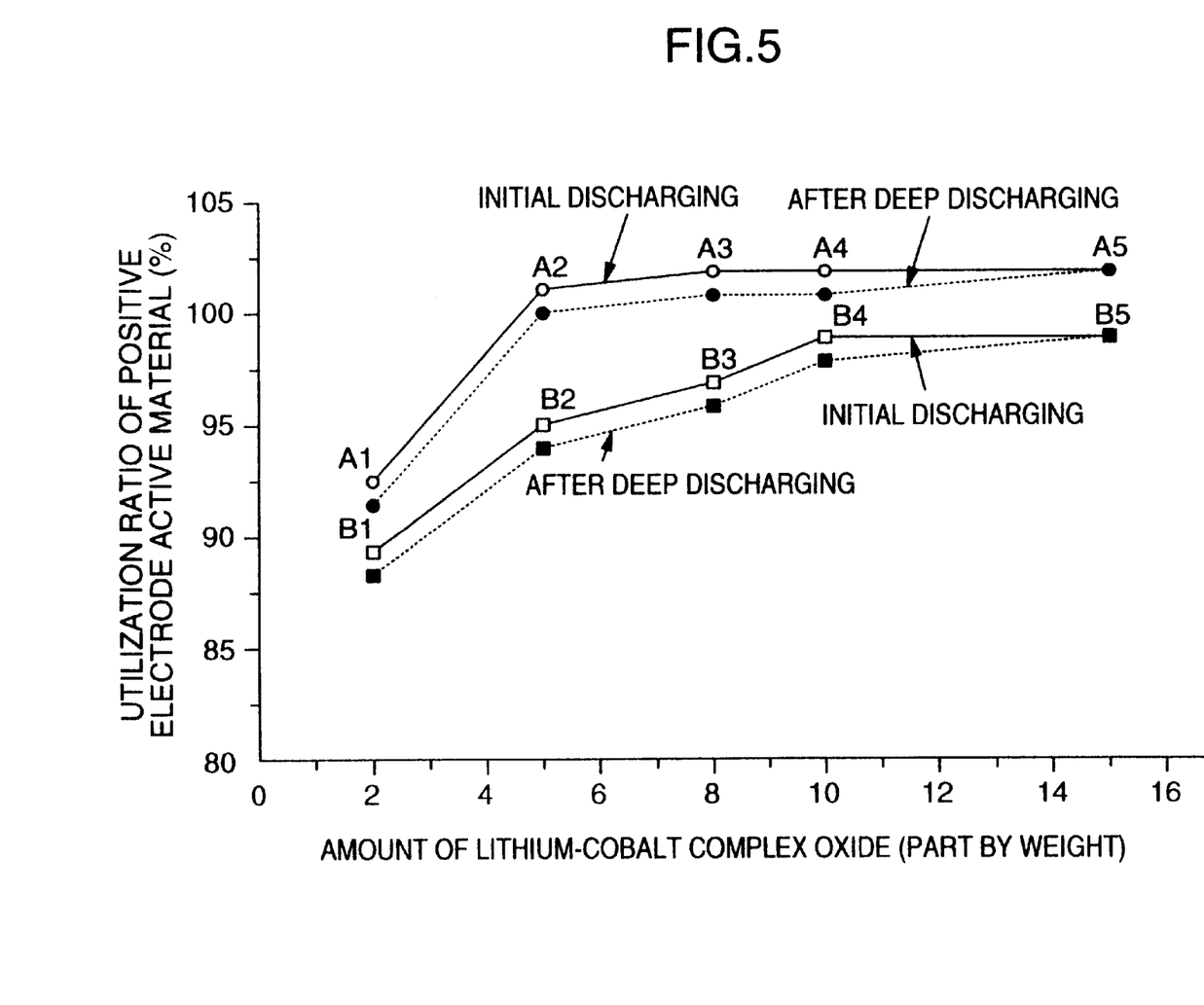
FIG. 5 is a graph which shows a relation between the amount of the lithium-cobalt complex oxide powders based on the amount of nickel hydroxide powders and utilization ratio of positive electrode active material before and after subjected to deep discharging in Example 3.

FIG. 5 shows relations between amount of the lithium-cobalt complex oxide as a conductive agent of the positive electrode of these batteries and initial utilization ratios of the positive electrode active materials or utilization ratios of the positive electrode active materials after deep discharging. As can be seen from FIG. 5, batteries A1–A5 were greater than batteries B1–B5 in improvement of the utilization ratio of the positive electrode active material for the amount of the conductive agent added. Therefore, in the batteries B1–B5, a high utilization ratio of the positive electrode active material of nearly 100% could not be obtained unless more than 10 parts by weight of the lithium-cobalt complex oxide powders were added to 100 parts by weight of nickel hydroxide powders. On the other hand, in the batteries A1–A5, a high utilization ratio of the positive electrode active material of more than 100% could be obtained with coating amount of 5 parts by weight of the lithium-cobalt complex oxide powders for 100 parts by weight of nickel hydroxide powders.

This is because in the batteries A1–A5, a coating layer of lithium-cobalt complex oxide as a conductive agent was formed on the surface of nickel hydroxide powders as shown in FIG. 4 which illustrates the relation between positive electrode active material powders, and, hence, adhesion between the lithium-cobalt complex oxide and the nickel hydroxide powders is higher than in batteries B1–B5 in which the lithium-cobalt complex oxide powders and the nickel hydroxide powders were in the state of mere contact with each other, and conductive network which heightens conductivity between positive electrode active material powders can be more effectively formed.

Figure 6:
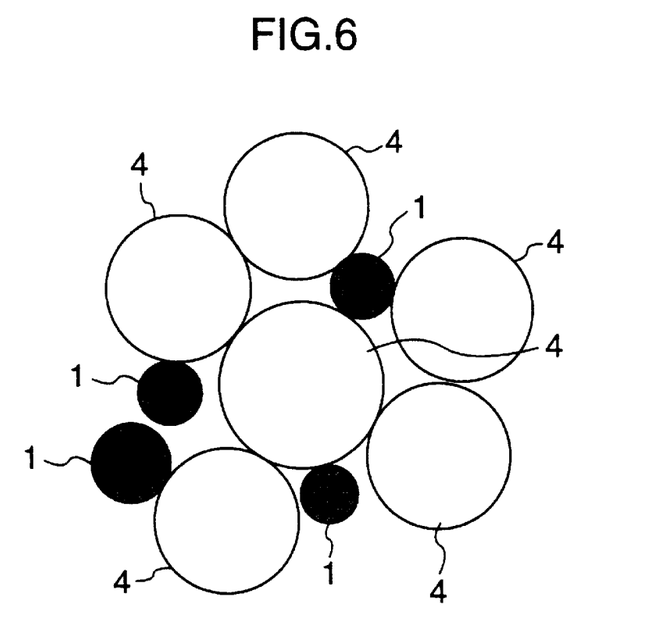
FIG. 6 schematically shows relation between powders of positive electrode active material in positive electrodes b1–b5 in Example 3.

Furthermore, in batteries B1–B5, nickel hydroxide powders 4 and lithium-cobalt complex oxide powders 1 as conductive agent were non-uniformly present as shown in FIG. 6 which illustrates the relation between positive electrode active material powders, and formation of the conductive network between positive electrode active material powders was not sufficient than in batteries A1–A5, and, thus, utilization ratio of positive electrode active material was lower than in batteries A1–A5.

Therefore, positive electrode plate made using nickel hydroxide powders and nickel hydroxide powders on the surface of which a coating layer of lithium-cobalt complex oxide is formed can provide a high utilization ratio of active material using a smaller amount of the conductive agent than in positive electrode plate made using a mere mixture of nickel hydroxide powders with lithium-cobalt complex oxide, and, hence, it becomes possible to make positive electrode plates of high capacity which are high in capacity density per unit volume.

Moreover, in batteries A1–A5, the utilization ratios of active materials after deep discharging obtained were high like the initial utilization ratios as shown in FIG. 5. This is because the lithium-cobalt complex oxide used as a conductive agent has a high stability against oxidation and reduction reactions, and even if batteries are in deeply discharged state, decomposition or dissolution reaction hardly takes place and a high conductivity can be maintained.

Coating amount of the lithium-cobalt complex oxide which covers the surface of nickel hydroxide powders is preferably about 5–10 parts by weight for 100 parts by weight of the nickel hydroxide powders. If the coating amount of the lithium-cobalt complex oxide is less than 5 parts by weight, a sufficient conductive network cannot be formed between positive electrode active material particles and, hence, no stable utilization ratio can be obtained, and if it exceeds 10 parts by weight, the proportion of the conductive agent in the positive electrode plate is too much, and high capacity density of positive electrode cannot be obtained.

Figure 7:
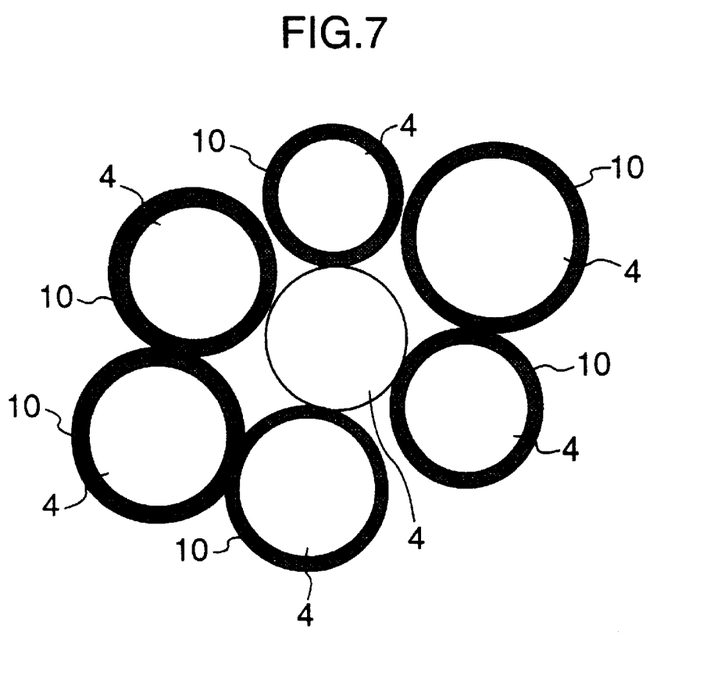
FIG. 7 schematically shows another relation between powders of positive electrode active material in Example 3.

In the example, a mixture comprising nickel hydroxide powders 4 and nickel hydroxide powders at least a part of the surface of which is covered with lithium-cobalt complex oxide 10 represented by the formula $Li_xCoO_2$ (x is 0.2–0.9) was used as the active material filled in the plaque of positive electrode, but when a mixture comprising nickel hydroxide powders 4 and nickel hydroxide powders the whole surface of which is covered with lithium-cobalt complex oxide as shown in FIG. 7 is used as the active material of positive electrode, contact of nickel hydroxide powders 4 with nickel hydroxide powders covered with lithium-cobalt complex oxide 10 as a conductive agent is further improved, and the conductive network between nickel hydroxide powders is more surely formed to heighten the utilization ratio of the positive electrode active material. Therefore, a utilization ratio of the positive electrode active material which exceeds 100% as in this example can be obtained using the lithium-cobalt complex oxide in a smaller amount than usual, namely, 2–8 parts by weight for 100 parts by weight of the nickel hydroxide powders in the positive electrode active material.

Figure 8:
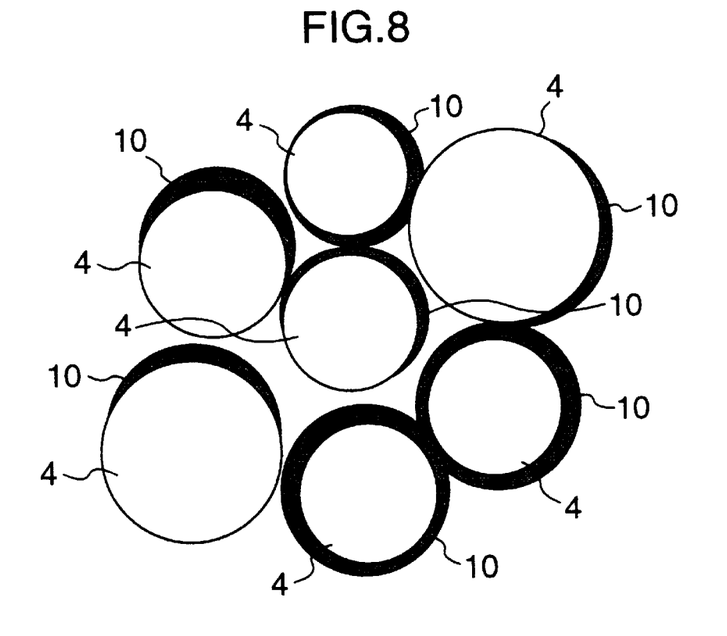
FIG. 8 schematically shows further another relation between powders of positive electrode active material in Example 3.

When nickel hydroxide powders at least a part of the surface of which is covered with lithium-cobalt complex oxide 10 represented by the formula $Li_xCoO_2$ (x is 0.2–0.9) as shown in FIG. 8 are used as the active material filled in the plaque of positive electrode, since contact of nickel hydroxide powders 4 with lithium-cobalt complex oxide 10 as a conductive agent is further improved, a utilization ratio of the positive electrode active material which exceeds 100% as in the example can be obtained using the lithium-cobalt complex oxide in a smaller amount, namely, 2–6 parts by weight for 100 parts by weight of the nickel hydroxide powders in the positive electrode active material.

Figure 9:
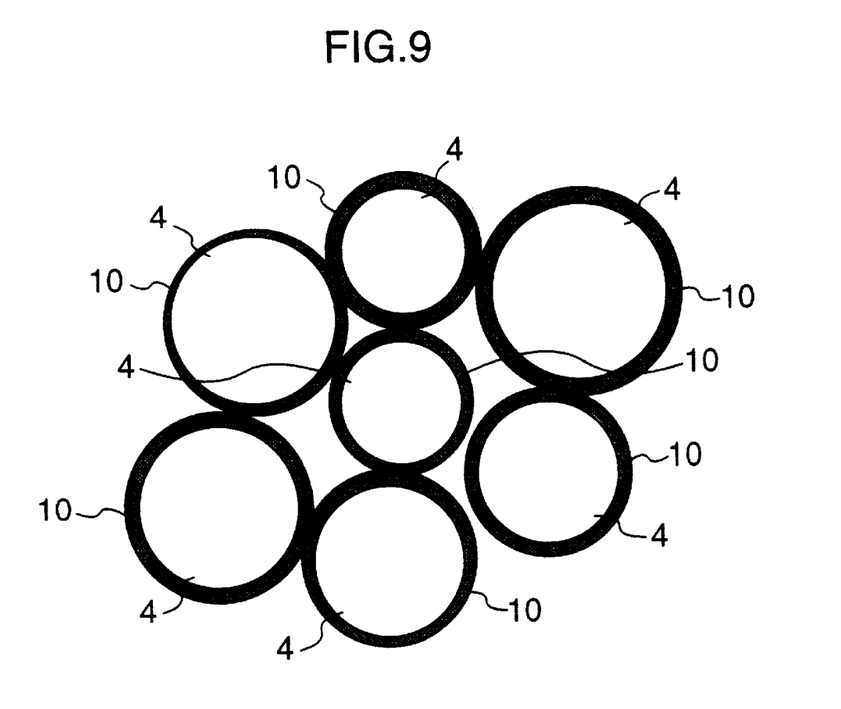
FIG. 9 schematically shows still another relation between powders of positive electrode active material in Example 3.

Furthermore, when nickel hydroxide powders, the whole surface of which is covered with lithium-cobalt complex oxide 10 represented by the formula $Li_xCoO_2$ (x is 0.2–0.9) as shown in FIG. 9 are used as the active material filled in the plaque of positive electrode, adhesion between nickel hydroxide powders 4 and lithium-cobalt complex oxide 10 as a conductive agent is becomes the strongest, and, besides, the conductive network between powders of positive electrode active material becomes sufficient. Therefore, a utilization ratio of the positive electrode active material which exceeds 100% as in the example can be obtained using the lithium-cobalt complex oxide in the smallest amount of 1–4 parts by weight for 100 parts by weight of the nickel hydroxide powders in the positive electrode active material.

Moreover, in the example, as a method for treating the surface of nickel hydroxide powders as positive electrode active material, the following method has been shown. That is, nickel hydroxide powders on which a cobalt hydroxide coating layer was formed were heat-treated in the air at 70–150° C. for 12–60 hours to oxidize cobalt hydroxide to cobalt oxyhydroxide. The nickel hydroxide powders on which a coating layer of cobalt oxyhydroxide was formed were suspended in an alkaline aqueous solution in which 20–100 g/l of lithium hydroxide was dissolved, and the reaction was carried out at 60–95° C. for 12–100 hours, thereby to form a coating layer of a lithium-cobalt complex oxide represented by the formula $Li_xCoO_2$ (x is 0.2–0.9).

As another surface-treating method, the following method can be employed. That is, nickel hydroxide powders on which a coating layer of a cobalt hydroxide is formed are treated with oxidizing agents such as sodium hypochlorite aqueous solution and aqueous hydrogen peroxide to oxidize cobalt hydroxide to cobalt oxyhydroxide, thereby to form nickel hydroxide powders coated with cobalt oxyhydroxide. Thereafter, the nickel hydroxide powders are subjected to the same treatments as above to form a coating layer of a lithium-cobalt complex oxide represented by the formula $Li_xCoO_2$ (x is 0.2–0.9).

As still another method, the following method can also be employed. An aqueous solution of a cobalt compound and an alkali are gradually added to an aqueous solution prepared by adding nickel hydroxide powders and an oxidizing agent to water, whereby a coating layer of cobalt oxyhydroxide is formed on the surface of the nickel hydroxide powders. Thereafter, the nickel hydroxide powders are subjected to the same treatments as above to form a coating layer of a lithium-cobalt complex oxide represented by the formula $Li_xCoO_2$ (x is 0.2–0.9).

In the above example, nickel hydroxide was used as powders of positive electrode active material, but nearly the same effects are obtained using solid solution powders mainly composed of nickel hydroxide and containing a small amount of cobalt or zinc. Moreover, nearly the same effects are obtained using nickel hydroxide powders in which a part of nickel hydroxide is oxidized to nickel oxyhydroxide.

Furthermore, the above example shows use of batteries in which the positive electrode is a nickel electrode and the negative electrode is a hydrogen-absorbing alloy electrode, but the present invention concerns with nickel electrode of alkaline storage batteries and can be similarly applied to batteries in which a cadmium electrode, an iron electrode, a zinc electrode or the like is used as the negative electrode.

EXAMPLE 4

Battery A

The lithium-cobalt complex oxide of the present invention which contained sodium atoms was prepared in the following manner.

100 parts by weight of $Co(OH)_2$ powders having an average particle size of 0.3 μm or less were impregnated with 10 parts by weight of sodium hydroxide aqueous solution (450 g/l) and oxidized with heating for 1 hour in the air at 120° C. to obtain a cobalt oxide increased in oxidation number and intercalating sodium atoms between layers.

The resulting cobalt oxide powders were mixed with aqueous lithium hydroxide solution (50 g/l) at a weight ratio of 1:10. The mixture was stirred for 2 hours with keeping the temperature at 80° C., followed by sufficient washing with water and drying to obtain lithium-cobalt complex oxide powders, which had an average particle size of 0.3 μm or less.

Contents of lithium, sodium and cobalt in the resulting lithium-cobalt complex oxide powders were measured by ICP spectrometry. As a result, it was confirmed that lithium was contained in an amount of 40 atomic % based on cobalt and sodium was contained in an amount of 15 atomic % based on cobalt.

One gram of the resulting lithium-cobalt complex oxide powders were press molded under a pressure of 2 t/cm² using a mold of 10 mm in diameter and a pressing machine to prepare pellets. A direct voltage was applied to the pellets, and a powder conductivity was measured from the current value to obtain $10^0$ S/cm.

Ten parts by weight of the above lithium-cobalt complex oxide powders as conductive agent were added to 100 parts by weight of nickel hydroxide powders having an average particle size of 20 μm as active material, and these were mixed. To the mixture was added water as a dispersion medium so that it occupied 25 parts by weight in total paste, followed by kneading to prepare a pasty active material. This was filled in a spongy nickel porous plaque having a porosity of 95%, dried and pressed. Then, this was cut to a given size to make a positive electrode plate a of the example of the present invention having a theoretical electric capacity of 1600 mAh.

A paste mainly composed of hydrogen-absorbing alloy powders having an average particle size of 20 μm was prepared and applied to a sheet comprising a punching metal. This was cut to a given size to make a negative electrode plate of 2500 mAh in theoretical electric capacity.

The above positive electrode plate and negative electrode plate and a separator of a polypropylene nonwoven fabric interposed between the positive and negative electrode plates were rolled to form an electrode assembly, which was inserted into a battery case and an alkaline electrolyte was injected thereinto in a given amount. Then, the case was sealed at its top portion with a sealing plate which also serves as a terminal for positive electrode, thereby to obtain a nickel-hydrogen storage battery A of 4/5A size (nominal capacity: 1600 mAh).

Battery B

Next, nickel hydroxide powders coated with the lithium-cobalt complex oxide containing sodium atoms were prepared in the following manner.

A cobalt sulfate aqueous solution having a specific gravity of 1.30 and a sodium hydroxide aqueous solution (200 g/l) were added to a solution prepared by suspending nickel hydroxide powders having an average particle size of 20 μm so as to maintain pH at 9–10 during the reaction, and cobalt hydroxide was precipitated on nickel hydroxide powders which were crystal nuclei. The proportion of a coating layer of cobalt hydroxide formed on the nickel hydroxide powders was adjusted to 4 parts by weight for 100 parts by weight of nickel hydroxide by adjusting the amount of the cobalt sulfate aqueous solution used for the treatment.

The nickel hydroxide powders coated with cobalt hydroxide obtained by the above treatment were washed with water, dried, impregnated with 10 parts by weight of sodium hydroxide aqueous solution (450 g/l) for 100 parts by weight of nickel hydroxide, and heated in the air at 120° C. for 1 hour to convert the cobalt hydroxide layer to a cobalt oxide increased in oxidation number and intercalating sodium between layers.

The resulting powders were mixed with an alkaline aqueous solution containing 50 g/l of lithium hydroxide at a weight ratio of 1:5. The mixture was stirred for 2 hours with keeping the temperature at 80° C. to react cobalt oxide with lithium, thereby to form a thin and uniform coating layer of lithium-cobalt complex oxide containing sodium.

To the coated powders was added water as a dispersion medium so that it occupied 25 parts by weight in total paste, followed by kneading to prepare a pasty active material. This was filled in a spongy nickel porous plaque having a porosity of 95%, dried and pressed. Then, this was cut to a given size to make a positive electrode plate b of the example of the present invention having a theoretical electric capacity of 1600 mAh.

Nickel-hydrogen storage battery B was fabricated in the same manner as in fabrication of battery A, except for using the positive electrode plate b.

Battery C

Nickel hydroxide powders coated with 4 parts by weight of lithium-cobalt complex oxide containing sodium described above for 100 parts by weight of nickel hydroxide powders were prepared.

The resulting nickel hydroxide powders were mixed with the lithium-cobalt complex oxide containing sodium. The total amount of the lithium-cobalt complex oxide in this case was 8.5 parts by weight based on 100 parts by weight of nickel hydroxide.

A positive electrode plate c was prepared in the same manner as in preparation of positive electrode plate a, except for using the resulting mixed powders. Nickel-hydrogen storage battery C was fabricated in the same manner as in fabrication of battery A, except for using the positive electrode plate c.

Battery D

Evaluation was conducted also in the case of using a mixture of nickel hydroxide powders and lithium-cobalt complex oxide powders containing no sodium as a conductive agent.

Lithium-cobalt complex oxide powders to be mixed with nickel hydroxide were prepared in the following manner.

Cobalt hydroxide powders having an average particle size of 0.3 μm were oxidized by heating for 48 hours in the air at 120° C. to obtain cobalt (III) oxyhydroxide powders.

The resulting cobalt oxyhydroxide powders were mixed with a lithium hydroxide aqueous solution (50 g/l) at a weight ratio of 1:10, and the mixture was stirred for 90 hours with keeping the temperature at 80° C., sufficiently washed with water and dried to prepare lithium-cobalt complex oxide powders.

Contents of lithium and cobalt in the lithium-cobalt complex oxide powders were measured by ICP emission spectroscopy to confirm that lithium was contained in an amount of 40 atomic % based on cobalt.

One gram of the lithium-cobalt complex oxide powders were press molded using a mold of 10 mm in diameter and a press machine under a pressure of 2 t/cm$^2$ to prepare pellets. Powder conductivity obtained from current value when a direct voltage was applied to the pellets was $10^{-2}$ S/cm. The lithium-cobalt complex oxide powders were added in an amount of 10 parts by weight to 100 parts by weight of nickel hydroxide powders and they were mixed to prepare active material powders. Using the resulting active material powders, a positive electrode plate d was prepared in the same manner as preparation of positive electrode plate a.

Nickel-hydrogen storage battery D was fabricated in the same manner as in fabrication of battery A, except for using the positive electrode plate d.

Battery E

Cobalt oxyhydroxide powders as a conductive agent were added in an amount of 10 parts by weight to 100 parts by weight of nickel hydroxide powders and they were mixed to prepare active material powders. Using the resulting active material powders, a positive electrode plate e was prepared in the same manner as preparation of positive electrode plate a.

Nickel-hydrogen storage battery E of comparative example was fabricated in the same manner as in fabrication of battery A, except for using the positive electrode plate e.

One gram of the cobalt oxyhydroxide powders used as a conductive agent were press molded using a mold of 10 mm in diameter and a press machine under a pressure of 2 t/cm$^2$ to prepare pellets. Powder conductivity obtained from current value when a direct voltage was applied to the pellets was $10^{-6}$ S/cm.

Batteries A, B, C and D of the examples and battery E of the comparative example were subjected to tests under the same conditions as explained in Example 1 to obtain initial utilization ratio of the positive electrode active material and utilization ratio of the positive electrode active material after deep discharging.

The results are also shown in Table 2.

TABLE 2

| Batteries | Initial utilization of positive electrode active material (%) | Utilization ratio of positive electrode active material after deep discharging (%) |
| --- | --- | --- |
| Battery A | 100 | 99 |
| Battery B | 102 | 101 |
| Battery C | 101 | 100 |
| Battery D | 97 | 96 |
| Battery E | 97 | 83 |

As shown in Table 2, high utilization ratios of positive electrode active materials nearly the same as initial utilization ratios were obtained even after deep discharging in batteries A, B, C and D as compared with battery E. This is because the lithium-cobalt complex oxide used as a conductive agent of positive electrode has a high stability against oxidation and reduction, and rupture of conductive network caused by decomposition or dissolution reaction hardly occurs even when batteries are in deeply discharged state.

Next, batteries A, B, C, D and E were charged with a current of 160 mA for 15 hours, then the charging was stopped for 1 hour, and, thereafter, the batteries were discharged at 320 mA (0.2 CmA), 1600 mA (1 CmA), 3200 mA (2 CmA), and 4800 mA (3 CmA), and utilization ratios of positive electrode active materials were obtained from actual discharge capacities of the positive electrode active materials for theoretical electric capacity. The results are shown in FIG. 10.

Figure 10:
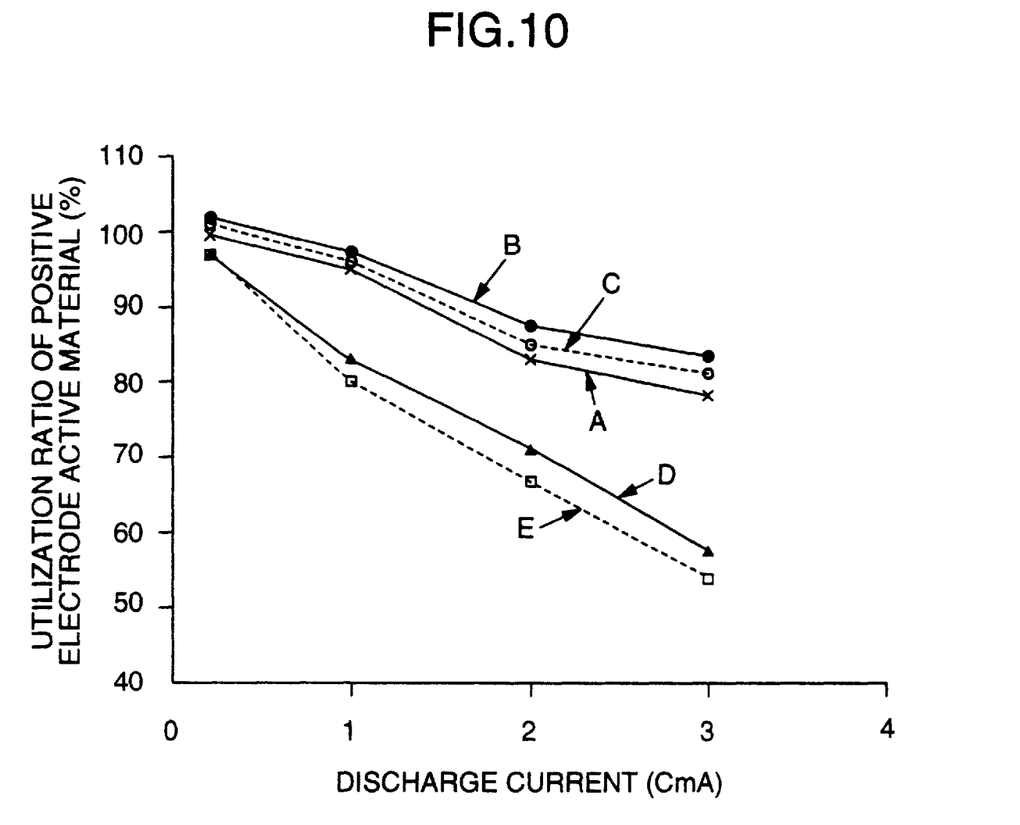
FIG. 10 is a graph which shows a relation between discharge current and utilization ratio of positive electrode active material in the battery of Example 4.

As shown in FIG. 10, batteries A, B and C were higher than batteries D and E in utilization ratio of positive electrode active materials when they were discharged at a great current of more than 1 CmA. This is because the lithium-cobalt complex oxide containing sodium used in batteries A, B and C as a conductive agent is in such a state that cobalt increases in oxidation number, and conductivity in this state is markedly higher than the lithium-cobalt complex oxide used in the positive electrode of battery D and cobalt oxyhydroxide used in battery E as a conductive agent, and, thus, the conductive network between powders of positive electrode active material of batteries A, B and C can be made superior, which makes it possible to pass the current in the case of discharging at a great current and to draw efficiently the electric capacity of the positive electrode active materials.

Furthermore, battery B was smaller than batteries A and C in the amount of lithium-cobalt complex oxide used in the positive electrode as a conductive agent, but showed superior discharge characteristics equal to or higher than those of batteries A and C even at a high rate discharge as shown in FIG. 10. This is because since a coating layer of the conductive agent is formed around nickel hydroxide powders in the positive electrode of battery B, adhesion between the conductive agent and the nickel hydroxide powders is higher than in battery A where the conductive agent is merely mixed with the nickel hydroxide powders and battery C where the nickel hydroxide powders having a coating layer of the conductive agent is mixed with the nickel hydroxide powders. As a result, in the positive electrode of battery B, sufficient conductive network can be formed between powders of the positive electrode active material with a smaller amount of the conductive agent than in the positive electrodes of batteries A and C.

In the battery A of the above example, lithium-cobalt complex oxide containing sodium as a conductive agent was used in an amount of 10 parts by weight based on 100 parts by weight of nickel hydroxide powders in the positive electrode. However, nearly the same effect as in the battery A can be obtained when amount of the conductive agent is in the range of 3–15 parts by weight.

In the battery C of the above example, lithium-cobalt complex oxide containing sodium as a conductive agent was used in the total amount of 8.5 parts by weight based on 100 parts by weight of nickel hydroxide powders in the positive electrode. However, nearly the same effect as in the battery C can be obtained when total amount of the conductive agent is in the range of 2–13 parts by weight.

Furthermore, in batteries A and C, the positive electrode was formed using nickel hydroxide powders and lithium-cobalt complex oxide powders having an average particle size of 0.3 μm or less, and the lithium-cobalt complex oxide powders were uniformly dispersed in the positive electrode. However, when the positive electrode is formed using nickel hydroxide powders and lithium-cobalt complex oxide powders having an average particle size of 1 μm or less, the lithium-cobalt complex oxide powders can also be uniformly dispersed in the positive electrode as in the positive electrodes of batteries A and C.

In the battery B, the nickel hydroxide powders in the positive electrode were coated with lithium-cobalt complex oxide containing sodium as a conductive agent in an amount of 4 parts by weight based on 100 parts by weight of nickel hydroxide. When the amount of the conductive agent which is coated on the nickel hydroxide powders is in the range of 1–6 parts by weight, nearly the same effect as in the battery B can be obtained.

Moreover, in batteries A, B and C of the examples, sodium was contained in an amount of 15 atomic % based on cobalt and lithium was contained in an amount of 40 atomic % based on cobalt in the lithium-cobalt complex oxide containing sodium as a conductive agent. However, nearly the same effect can be obtained when amount of sodium is in the range of 2–30 atomic % based on cobalt and amount of lithium is in the range of 1–90 atomic % based on cobalt in the conductive agent. Furthermore, contents of sodium and lithium in the conductive agent are most preferably 10–20 atomic % of sodium and 30–60 atomic % of lithium based on the amount of cobalt.

In batteries A, B and C of the examples, lithium-cobalt complex oxide containing sodium was used as a conductive agent of the positive electrode. However, it is considered that nearly the same effect can be obtained when lithium-cobalt complex oxide containing potassium alone or both sodium and potassium is used as a conductive agent based on the same idea as above.

Moreover, in the above examples, nickel hydroxide was used as the positive electrode active material. However, nearly the same effect can be obtained when solid solution powders mainly composed of nickel hydroxide and containing a small amount of cobalt or zinc are used. Further, nearly the same effect can be obtained when nickel hydroxide powders in which a part of nickel hydroxide is oxidized to nickel oxyhydroxide are used.

Furthermore, in the batteries of the above examples, a nickel electrode was used as the positive electrode and a hydrogen-absorbing alloy electrode was used as the negative electrode, but the present invention relates to a nickel electrode in an alkaline storage battery and can be similarly applied to the batteries in which a cadmium electrode, an iron electrode, a zinc electrode or the like is used as the negative electrode.

What is claimed is:

1. An alkaline storage battery which comprises a positive electrode comprising a nickel hydroxide as an active material filled in a porous plaque, a negative electrode, a separator and an alkaline electrolyte, wherein said positive electrode contains a mixture of
    i) nickel hydroxide powders and
    ii) lithium-cobalt complex oxide powders represented by the formula $Li_xCoO_2$ (x is 0.2–0.9) as a conductive agent.

2. An alkaline storage battery according to claim 1, wherein amount of the lithium-cobalt complex oxide powders is 5–15 parts by weight based on 100 parts by weight of the nickel hydroxide powders.

3. An alkaline storage battery according to claim 1, wherein the lithium-cobalt complex oxide powders have an average particle size of 1 μm or less.

4. An alkaline storage battery which comprises a positive electrode comprising a nickel hydroxide as an active material filled in a porous plaque, a negative electrode, a separator and an alkaline electrolyte, wherein said positive electrode contains a mixture of
    i) nickel hydroxide powders and
    ii) lithium-cobalt complex oxide powders as a conductive agent, and the lithium-cobalt complex oxide powders contain one or both of sodium and potassium in an amount of 2–30 atomic % based on cobalt and contain lithium in an amount of 10–90 atomic % based on cobalt.

5. An alkaline storage battery according to claim 4, wherein the amount of the lithium-cobalt complex oxide powders is 3–15 parts by weight based on 100 parts by weight of the nickel hydroxide powders.

6. An alkaline storage battery according to claim 4, wherein the lithium-cobalt complex oxide powders have an average particle size of 1 μm or less.

7. An alkaline storage battery which comprises a positive electrode comprising a nickel hydroxide as an active material filled in a porous plaque, a negative electrode, a separator and an alkaline electrolyte, wherein said positive electrode contains a mixture of
  i) nickel hydroxide powders and
  ii) lithium-cobalt complex oxide powders as a conductive agent, and the lithium-cobalt complex oxide powders contain one or both of sodium and potassium in an amount of 10–20 atomic % based on cobalt and contain lithium in an amount of 30–60 atomic % based on cobalt.

8. An alkaline storage battery according to claim 7, wherein amount of the lithium-cobalt complex oxide powders is 3–15 parts by weight based on 100 parts by weight of the nickel hydroxide powders.

9. An alkaline storage battery according to claim 7, wherein the lithium-cobalt complex oxide powders have an average particle size of 1 μm or less.

10. An alkaline storage battery which comprises a positive electrode comprising a nickel hydroxide as an active material filled in a porous plaque, a negative electrode, a separator, and an alkaline electrolyte, wherein said active material comprises a mixture of i) nickel hydroxide powders and ii) coated nickel hydroxide powders, at least a part of the surface of the coated nickel hydroxide powders being coated by a lithium-cobalt complex oxide represented by the formula $Li_xCoO_2$ (x is 0.2–0.9).

11. An alkaline storage battery according to claim 10, wherein the lithium-cobalt complex oxide which covers the surface of the nickel hydroxide powders covers the whole surface of the powders.

12. An alkaline storage battery which comprises a positive electrode comprising a nickel hydroxide as an active material filled in a porous plaque, a negative electrode, a separator and an alkaline electrolyte, wherein said active material filled in the plaque of the positive electrode comprises nickel hydroxide powders, at least a part of the surface of which is covered with a lithium-cobalt complex oxide represented by the formula $Li_xCoO_2$ (x is 0.2–0.9).

13. An alkaline storage battery according to claim 12, wherein the lithium-cobalt complex oxide which covers the surface of the nickel hydroxide powders covers the whole surface of the powders.

14. An alkaline storage battery which comprises a positive electrode comprising a nickel hydroxide as an active material filled in a porous plaque, a negative electrode, a separator and an alkaline electrolyte, wherein at least a part of the surface of the nickel hydroxide powders of the positive electrode is covered with a lithium-cobalt complex oxide and the lithium-cobalt complex oxide powders contain one or both of sodium and potassium in an amount of 2–30 atomic % based on cobalt and contain lithium in an amount of 10–90 atomic % based on cobalt.

15. An alkaline storage battery according to claim 14, wherein the amount of the lithium-cobalt complex oxide is 1–6 parts by weight based on 100 parts by weight of the nickel hydroxide powders.

16. An alkaline storage battery which comprises a positive electrode comprising a nickel hydroxide as an active material filled in a porous plaque, a negative electrode, a separator and an alkaline electrolyte, wherein at least a part of the surface of the nickel hydroxide powders of the positive electrode is covered with a lithium-cobalt complex oxide, and the lithium-cobalt complex oxide powders contain one or both of sodium and potassium in an amount of 10–20 atomic % based on cobalt and contain lithium in an amount of 30–60 atomic % based on cobalt.

17. An alkaline storage battery according to claim 16, wherein the amount of the lithium-cobalt complex oxide is 1–6 parts by weight based on 100 parts by weight of the nickel hydroxide powders.

18. An alkaline storage battery which comprises a positive electrode comprising a nickel hydroxide as an active material filled in a porous plaque, a negative electrode, a separator and an alkaline electrolyte, wherein said positive electrode contains a mixture of
  i) nickel hydroxide powders, at least a part of the surface of which is covered with a lithium-cobalt complex oxide represented by the formula $Li_xCoO_2$ (x is 0.2–0.9) and
  ii) lithium-cobalt complex oxide powders represented by the formula $Li_xCoO_2$ (x is 0.2–0.9).

19. An alkaline storage battery according to claim 18, wherein the total amount of the lithium-cobalt complex oxide is 4–13 parts by weight based on 100 parts by weight of the nickel hydroxide powders.

20. An alkaline storage battery according to claim 18, wherein the lithium-cobalt complex oxide powders have an average particle size of 1 μm or less.

21. An alkaline storage battery which comprises a positive electrode comprising a nickel hydroxide as an active material filled in a porous plaque, a negative electrode, a separator and an alkaline electrolyte, wherein said positive electrode contains a mixture of
  i) nickel hydroxide powders, at least a part of the surface of which is covered with a lithium-cobalt complex oxide and
  ii) lithium-cobalt complex oxide powders, and the lithium-cobalt complex oxide contains one or both of sodium and potassium in an amount of 2–30 atomic % based on cobalt and contains lithium in an amount of 10–90 atomic % based on cobalt.

22. An alkaline storage battery according to claim 21, wherein the total amount of the lithium-cobalt complex oxide is 2–13 parts by weight based on 100 parts by weight of the nickel hydroxide powders.

23. An alkaline storage battery which comprises a positive electrode comprising a nickel hydroxide as an active material filled in a porous plaque, a negative electrode, a separator and an alkaline electrolyte, wherein said positive electrode contains a mixture of
  i) nickel hydroxide powders, at least a part of the surface of which is covered with a lithium-cobalt complex oxide and
  ii) lithium-cobalt complex oxide powders, and the lithium-cobalt complex oxide contains one or both of sodium and potassium in an amount of 10–20 atomic % based on cobalt and contains lithium in an amount of 30–60 atomic % based on cobalt.

24. An alkaline storage battery according to claim 23, wherein the total amount of the lithium-cobalt complex oxide is 2–13 parts by weight based on 100 parts by weight of the nickel hydroxide powders.

25. An alkaline storage battery according to claim 23, wherein the lithium-cobalt complex oxide powders have an average particle size of 1 μm or less.

26. A method for treating a surface of a positive electrode active material for an alkaline storage battery which comprises a step of forming a coating layer of cobalt hydroxide on nickel hydroxide powders by adding an aqueous solution of a cobalt compound and an alkali to a suspension prepared by adding nickel hydroxide powders to water as a dispersion medium, a step of thermal oxidation of the cobalt hydroxide to cobalt oxyhydroxide by heat treating the nickel hydroxide powders on which the coating layer of cobalt hydroxide is formed, at 70–150° C. for 12–60 hours in air, and a step of forming a coating layer of a lithium-cobalt complex oxide represented by the formula $Li_xCoO_2$ (x is 0.2–0.9) by suspending the nickel hydroxide powders on which the coating layer of cobalt oxyhydroxide is formed in the above thermal oxidation step in an alkali aqueous solution containing 20–100 g/l of lithium hydroxide and carrying out a reaction at 60–95° C. for 12–100 hours.

27. A method for treating a surface of a positive electrode active material for an alkaline storage battery which comprises a step of forming a coating layer of cobalt hydroxide on the surface of nickel hydroxide powders by adding an aqueous solution of a cobalt compound and an alkali to a suspension prepared by adding nickel hydroxide powders to water as a dispersion medium, a step of chemical oxidation of the cobalt hydroxide coating layer on the nickel hydroxide powders to cobalt oxyhydroxide using an oxidizing agent, and a step of forming a coating layer of a lithium-cobalt complex oxide represented by the formula $Li_xCoO_2$ (x is 0.2–0.9) by suspending the nickel hydroxide powders on which the coating layer of cobalt oxyhydroxide is formed in the above chemical oxidation step in an alkali aqueous solution containing 20–100 g/l of lithium hydroxide and carrying out a reaction at 60–95° C. for 12–100 hours.

28. A method for treating a surface of a positive electrode active material for an alkaline storage battery which comprises a step of forming a coating layer of cobalt oxyhydroxide on the surface of nickel hydroxide by adding an aqueous solution of a cobalt compound and an alkali to a suspension prepared by adding nickel hydroxide powders and an oxidizing agent to water as a dispersion medium, and a step of forming a coating layer of a lithium-cobalt complex oxide represented by the formula $Li_xCoO_2$ (x is 0.2–0.9) by suspending the nickel hydroxide powders on which the coating layer of cobalt oxyhydroxide is formed in the above coating layer forming step in an alkali aqueous solution containing 20–100 g/l of lithium hydroxide and carrying out a reaction at 60–95° C. for 12–100 hours.

* * * * *